United States Patent
Frayer et al.

(10) Patent No.: US 10,137,938 B2
(45) Date of Patent: *Nov. 27, 2018

(54) ACTIVE GRILLE SHUTTER SYSTEM WITH INTEGRATED RADAR

(71) Applicant: SRG Global Inc., Troy, MI (US)

(72) Inventors: Rob Frayer, Huntington Woods, MI (US); Kurt Meier, Shelby Township, MI (US); James DeLaHoussaye, Sterling Heights, MI (US)

(73) Assignee: SRG Global Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,622

(22) Filed: Oct. 27, 2017

(65) Prior Publication Data

US 2018/0043940 A1    Feb. 15, 2018

Related U.S. Application Data

(63) Continuation of application No. 14/950,723, filed on Nov. 24, 2015, now Pat. No. 9,828,036.

(51) Int. Cl.
*B62D 25/08* (2006.01)
*G01S 13/93* (2006.01)
(Continued)

(52) U.S. Cl.
CPC ........ *B62D 25/082* (2013.01); *B60K 31/0008* (2013.01); *G01S 13/931* (2013.01);
(Continued)

(58) Field of Classification Search
CPC ....... B60K 11/04; B60K 11/08; B60K 11/085; B62D 25/082
See application file for complete search history.

(56) References Cited

U.S. PATENT DOCUMENTS

| | | |
|---|---|---|
| 4,329,692 A | 5/1982 | Brunner |
| 4,896,164 A | 1/1990 | Burke et al. |

(Continued)

FOREIGN PATENT DOCUMENTS

| | | |
|---|---|---|
| CN | 202863358 U | 4/2013 |
| DE | 102011107216 A1 | 3/2012 |

(Continued)

OTHER PUBLICATIONS

PCT International Search Report and Written Opinion dated Feb. 28, 2017 for PCT International Application No. PCT/US2016/062197, 10 pages.

(Continued)

*Primary Examiner* — Brian L Swenson (57) ABSTRACT

An active grille shutter (AGS) system for a vehicle can include a housing defining first, second, and third openings, the third opening being located between the first and second openings and being configured to receive an object detection device that is configured to detect objects in front of the vehicle, a first set of louvers arranged in the first opening, a second set of louvers arranged in the second opening, and a linkage connecting the first and second sets of louvers, wherein a set of actuators are configured to selectively open/close the first and second sets of louvers by driving the linkage or at least one of the first and second sets of louvers. The AGS system can be configured to be fully-integrated, semi-integrated, or standalone with respect to a grille assembly of the vehicle.

20 Claims, 4 Drawing Sheets

(51) Int. Cl.
*B60K 31/00* (2006.01)
*H01Q 1/32* (2006.01)
*H01Q 1/42* (2006.01)
*B60K 11/08* (2006.01)

(52) U.S. Cl.
CPC ............ *H01Q 1/3233* (2013.01); *H01Q 1/42* (2013.01); *B60K 11/085* (2013.01); *G01S 2013/9321* (2013.01); *G01S 2013/9375* (2013.01); *Y02T 10/88* (2013.01)

(56) References Cited

U.S. PATENT DOCUMENTS

| | | |
|---|---|---|
| 5,485,159 A | 1/1996 | Zhang et al. |
| 5,657,024 A | 8/1997 | Shingyoji et al. |
| 5,682,168 A | 10/1997 | James et al. |
| 5,717,399 A | 2/1998 | Urabe et al. |
| 5,886,674 A | 3/1999 | Yoshimi |
| 5,929,802 A | 7/1999 | Russell et al. |
| 6,061,015 A | 5/2000 | Sugimoto |
| 6,184,842 B1 | 2/2001 | Leinweber et al. |
| 6,243,024 B1 | 6/2001 | Yamabuchi et al. |
| 6,328,358 B1 | 12/2001 | Berweiler |
| 6,348,889 B1 | 2/2002 | Ashihara et al. |
| 6,414,623 B1 | 7/2002 | Ashihara |
| 6,433,753 B1 | 8/2002 | Zimmermann |
| 6,469,659 B1 | 10/2002 | Lajiness et al. |
| 6,496,138 B1 | 12/2002 | Honma |
| 6,750,819 B2 | 6/2004 | Rahaim et al. |
| 6,842,152 B2 | 1/2005 | Kikuchi |
| 6,897,819 B2 | 5/2005 | Henderson et al. |
| 6,937,184 B2 | 8/2005 | Fujieda et al. |
| 6,954,172 B2 | 10/2005 | Hofmann et al. |
| 6,961,023 B2 | 11/2005 | Fujii et al. |
| 7,009,551 B1 | 3/2006 | Sapletal et al. |
| 7,044,517 B2 | 5/2006 | Hyuga |
| 7,226,187 B2 | 6/2007 | Yamazaki et al. |
| 7,245,261 B2 | 7/2007 | Zafar et al. |
| 7,256,746 B2 | 8/2007 | Kamiya et al. |
| 7,295,166 B2 | 11/2007 | Fujii et al. |
| 7,342,532 B1 | 3/2008 | Matsuoka |
| 7,460,054 B2 | 12/2008 | Kim et al. |
| 7,467,455 B2 | 12/2008 | Aigner et al. |
| 7,477,181 B2 | 1/2009 | Banaszak et al. |
| 7,482,990 B2 | 1/2009 | Fujii et al. |
| 7,486,222 B2 | 2/2009 | Matsuoka |
| 7,498,971 B2 | 3/2009 | Takagi |
| 7,508,353 B2 | 3/2009 | Shingyoji |
| 7,538,714 B2 | 5/2009 | Nishijima |
| 7,538,734 B2 | 5/2009 | Fujii et al. |
| 7,548,210 B2 | 6/2009 | Hashiguchi et al. |
| 7,619,575 B2 | 11/2009 | Kamiya et al. |
| 7,675,460 B2 | 3/2010 | Sanada |
| 7,724,180 B2 | 5/2010 | Yonak et al. |
| 7,737,882 B2 | 6/2010 | Matsuoka |
| 7,824,782 B2 | 11/2010 | Kamiya et al. |
| 7,846,498 B2 | 12/2010 | Ido et al. |
| 7,990,334 B2 | 8/2011 | Maeda et al. |
| 8,043,678 B2 | 10/2011 | Utsumi et al. |
| 8,130,138 B2 | 3/2012 | Kikuchi |
| 8,164,511 B2 | 4/2012 | Kishida et al. |
| 8,174,432 B2 | 5/2012 | Kawasaki et al. |
| 8,179,303 B2 | 5/2012 | Kishida et al. |
| 8,287,990 B2 | 10/2012 | Maeda et al. |
| 8,441,394 B2 | 5/2013 | Alland |
| 8,487,820 B2 | 7/2013 | Tajima |
| 8,604,968 B2 | 12/2013 | Alland et al. |
| 8,614,640 B2 | 12/2013 | Lynam |
| 8,702,135 B2 | 4/2014 | Gaboury et al. |
| 8,931,439 B2 | 1/2015 | Hemphill et al. |
| 9,110,162 B2 | 8/2015 | Matsuzawa et al. |
| 9,233,605 B2 | 1/2016 | Hijikata |
| 2002/0057195 A1 | 5/2002 | Yamamura |
| 2002/0171579 A1 | 11/2002 | Artis et al. |
| 2003/0052810 A1 | 3/2003 | Artis et al. |
| 2005/0023057 A1 | 2/2005 | Maeda et al. |
| 2005/0216169 A1 | 9/2005 | Arai |
| 2006/0055603 A1 | 3/2006 | Jesson et al. |
| 2006/0099354 A1 | 5/2006 | Aichholzer et al. |
| 2009/0297880 A1 | 12/2009 | Maruoka et al. |
| 2010/0207842 A1 | 8/2010 | Kawaguchi et al. |
| 2011/0005851 A1 | 1/2011 | Doroghazi et al. |
| 2011/0047784 A1 | 3/2011 | Ohtake et al. |
| 2011/0050525 A1 | 3/2011 | Sanada et al. |
| 2012/0119961 A1 | 5/2012 | Pujadas |
| 2012/0305818 A1 | 12/2012 | Charnesky et al. |
| 2013/0081785 A1 | 4/2013 | Yoo |
| 2013/0330525 A1 | 12/2013 | Yoshinaga et al. |
| 2014/0049427 A1 | 2/2014 | Keckes et al. |
| 2014/0313100 A1 | 10/2014 | Yamamoto |
| 2015/0140259 A1 | 5/2015 | Sugiura et al. |
| 2015/0321548 A1 | 11/2015 | Hori et al. |
| 2016/0096425 A1 | 4/2016 | Walters |
| 2017/0015190 A1 | 1/2017 | Yoon et al. |
| 2017/0050509 A1 | 2/2017 | Aizawa et al. |
| 2017/0050510 A1 | 2/2017 | Manhire |
| 2017/0066319 A1 | 3/2017 | Knauer |
| 2017/0072783 A1 | 3/2017 | Jeong |

FOREIGN PATENT DOCUMENTS

| | | |
|---|---|---|
| DE | 102014103667 A1 | 10/2014 |
| DE | 102014108575 A1 | 11/2014 |
| EP | 0055420 A2 | 7/1982 |
| EP | 1045471 A1 | 10/2000 |
| EP | 1750329 A1 | 2/2007 |
| EP | 1812989 B1 | 12/2008 |
| EP | 2151888 A1 | 2/2010 |
| EP | 2151889 A1 | 2/2010 |
| EP | 2455260 B1 | 7/2014 |
| JP | S56164970 A | 12/1981 |
| JP | H01316678 A | 12/1989 |
| JP | H10150316 A | 6/1998 |
| JP | H11160426 A | 6/1999 |
| JP | H11248835 A | 9/1999 |
| JP | 2000103283 A | 4/2000 |
| JP | 2000304844 A | 11/2000 |
| JP | 2002131413 A | 5/2002 |
| JP | 2002135030 A | 5/2002 |
| JP | 2003149343 A | 5/2003 |
| JP | 2003156560 A | 5/2003 |
| JP | 2003202369 A | 7/2003 |
| JP | 2003224414 A | 8/2003 |
| JP | 2003240838 A | 8/2003 |
| JP | 2003243920 A | 8/2003 |
| JP | 2003252137 A | 9/2003 |
| JP | 2004138572 A | 5/2004 |
| JP | 2005112193 A | 4/2005 |
| JP | 2006003162 A | 1/2006 |
| JP | 2006281841 A | 10/2006 |
| JP | 2007013722 A | 1/2007 |
| JP | 2007093241 A | 4/2007 |
| JP | 2007104199 A | 4/2007 |
| JP | 2008107283 A | 5/2008 |
| JP | 2008122188 A | 5/2008 |
| JP | 2009198192 A | 9/2009 |
| JP | 2010066152 A | 3/2010 |
| JP | 2010111010 A | 5/2010 |
| JP | 2010216924 A | 9/2010 |
| JP | 2011077888 A | 4/2011 |
| WO | 2001048509 A2 | 7/2001 |
| WO | 2002021636 A1 | 3/2002 |
| WO | 2012100805 A1 | 8/2012 |
| WO | 2013065845 A1 | 5/2013 |

OTHER PUBLICATIONS

PCT International Search Report and Written Opinion dated Jul. 21, 2017 for PCT International Application No. PCT/US2017/029570, 9 pages.

ACTIVE GRILLE SHUTTER SYSTEM WITH INTEGRATED RADAR

CROSS-REFERENCE TO RELATED APPLICATIONS

This application is a continuation of U.S. application Ser. No. 14/950,723, filed Nov. 24, 2015. The disclosure of the above application is incorporated herein by reference in its entirety.

FIELD

The present disclosure generally relates to vehicle radiator grille assemblies and, more particularly, to an active grille shutter (AGS) system with integrated radar.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle can be propelled by a powertrain that generates drive torque. In some implementations, the powertrain can be arranged in a front compartment of the vehicle underneath a hood. During operation, the powertrain can generate a large amount of heat. To mitigate overheating of the powertrain and potential damage to other components in the powertrain compartment, a cooling system can be implemented. One example component of the cooling system is a heat transfer device, such as a radiator. Air can flow through openings at a front of the compartment to cool the radiator. These openings can also be referred to as a grille assembly of the vehicle.

An active grille shutter (AGS) system can be implemented to control airflow through the grille assembly. Example uses of the AGS system include controlling temperature in the powertrain compartment and improving vehicle aerodynamics for increased vehicle fuel economy.

SUMMARY

An active grille shutter (AGS) system for a vehicle is presented. The system can include a housing defining first, second, and third openings, the third opening being located between the first and second openings and being configured to receive an object detection device that is configured to detect objects in front of the vehicle. The system can further include a first set of louvers arranged in the first opening, a second set of louvers arranged in the second opening, and a linkage connecting the first and second sets of louvers, wherein a set of actuators are configured to selectively open/close the first and second sets of louvers by driving the linkage or at least one of the first and second sets of louvers.

In some embodiments, the third opening is aligned with a cover arranged in front of the object detection device and within or behind a grille assembly of the vehicle, and the cover is configured to protect the object detection device and allow acceptable transmission from/to the object detection device.

In some embodiments, the system can further include a mounting device arranged in the third opening and configured to receive the object detection device. In some embodiments, the linkage is arranged proximate to the third opening and between the first and second openings. In some embodiments, the linkage is arranged around an outside of the third opening.

In some embodiments, the system can further include the set of actuators, wherein the set of actuators are arranged proximate to the third opening and the linkage, and the set of actuators are configured to drive the linkage to selectively open/close the first and second sets of louvers. In some embodiments, the set of actuators, wherein a portion of the set of actuators are arranged at a first end of the housing proximate to the first opening, wherein a remainder of the set of actuators are arranged at a second opposing end of the housing proximate to the second opening, wherein the set of actuators are configured to drive at least one of the first and second sets of louvers.

Another system for a vehicle is also presented. The system can include an object detection device configured to detect objects in front of the vehicle an AGS system. The AGS system can include a housing defining first, second, and third openings, the third opening being located between the first and second openings, a first set of louvers arranged in the first opening, a second set of louvers arranged in the second opening, a linkage connecting the first and second sets of louvers, and a set of actuators configured to selectively open/close the first and second sets of louvers by driving the linkage or at least one of the first and second sets of louvers, wherein the object detection device is arranged proximate to the third opening.

In some embodiments, the object detection device is arranged in the third opening behind a cover, wherein the cover is arranged in front of the object detection device and within or behind a grille assembly of the vehicle, and wherein the cover is configured protect the object detection device and allow acceptable transmission from/to the object detection device. In some embodiments, the cover is a decorative emblem of the vehicle grille assembly. In some embodiments, the linkage is arranged proximate to the third opening and between the first and second openings. In some embodiments, the linkage is arranged around an outside of the third opening.

In some embodiments, the set of actuators are arranged proximate to the third opening and the linkage, and the set of actuators are configured to drive the linkage. In some embodiments, a portion of the set of actuators are arranged at a first end of the housing proximate to the first opening, a remainder of the set of actuators are arranged at a second opposing end of the housing proximate to the second opening, and the set of actuators are configured to drive at least one of the first and second sets of louvers.

A grille assembly for a vehicle is also presented. The assembly can include a housing, an object detection device disposed within the housing and being configured to detect objects in front of the vehicle, and a cover arranged in front of the object detection device, and an AGS system disposed within the housing and defining first, second, and third openings of the housing. The AGS system can include a first set of louvers arranged in the first opening, a second set of louvers arranged in the second opening, a linkage connecting the first and second sets of louvers, and a set of actuators configured to selectively open/close the first and second sets of louvers by driving the linkage or at least one of the first and second sets of louvers, wherein the object detection device is arranged proximate to the third opening.

In some embodiments, the third opening is aligned with the cover and the object detection device is mounted within the third opening by a mounting device of the AGS system.

In some embodiments, the cover defines a thickness that provides for substantially uniform electromagnetic transmission. In some embodiments, the cover is part of the housing. In some embodiments, the cover is a decorative emblem of the vehicle grille assembly.

In some embodiments, the linkage is arranged proximate to the third opening and at least a portion of the set of actuators are arranged at a first end of the grille assembly proximate to the first opening, and the set of actuators are configured to drive at least one of the first and second sets of louvers.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, an active grille shutter (AGS) system can be implemented to control airflow through a grille assembly of a vehicle. One example position for the AGS system is behind the grille and towards a powertrain compartment of the vehicle. Vehicles can also include an object detection device for detecting nearby objects. Example uses of the object detection device include, but are not limited to, active or adaptive cruise control (ACC) and collision avoidance. While a radio detection and ranging (radar) device is specifically discussed herein, it will be appreciated that any suitable object detection device (a light detection and ranging (lidar) device, a camera, a proximity sensor, etc.) could be integrated with the AGS system. When implemented at a front of the vehicle, one example position for the radar device is also behind the grille. In some implementations, the ideal position for both the AGS system and the radar device is behind the grille. Positioning of the radar device, however, may depend on operational requirements of the radar device. In some implementations, for example, there can be nothing between the radar device and its cover and/or the cover may need to be made of a specific material and/or have a uniform thickness for maximum transmission. Further, when implemented along with an AGS system, operation of the AGS system and the radar device may require coordination.

Accordingly, an AGS system with integrated radar is presented. The AGS and radar system may be either a standalone system (entirely separate from the vehicle grille assembly), a semi-integrated system (partially-integrated into the vehicle grille assembly), or a fully-integrated system (fully-integrated as part of the vehicle grille assembly). For at least the standalone and semi-integrated AGS and radar systems, a different housing from the vehicle grille housing can be utilized. In each embodiment, however, the housing can include an AGS system that can be configured to receive a radar device. In some implementations, the radar device is either integrated into the housing or can be mounted via a mounting device. As previously mentioned, while a radar device is specifically discussed herein, any suitable object detection device (a lidar device, a camera, a proximity sensor, etc.) could be integrated in the AGS system to detect objects in front of the vehicle. The AGS and radar system is configured such that both the AGS system and the radar device are positioned at ideal locations (e.g., just behind the vehicle grille) while also both functioning as intended.

Figure 1A:
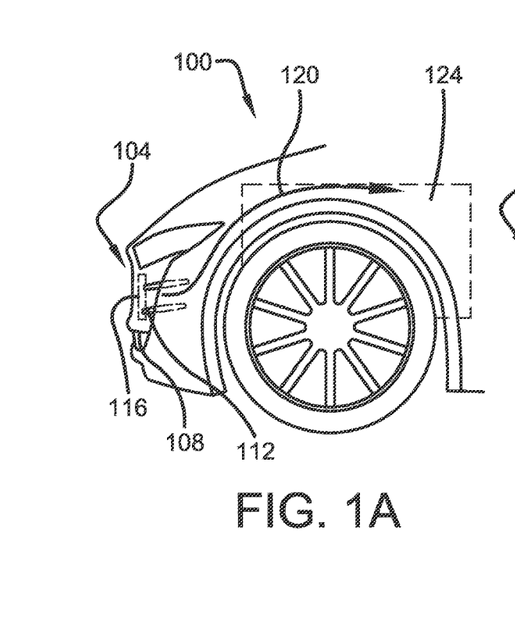
FIGS. 1A-1C are side views of a vehicle and example positions, with respect to a grille assembly of the vehicle, for fully-integrated, semi-integrated, and standalone active grille shutter (AGS) and radar systems, according to some implementations of the present disclosure.
Figure 1B:
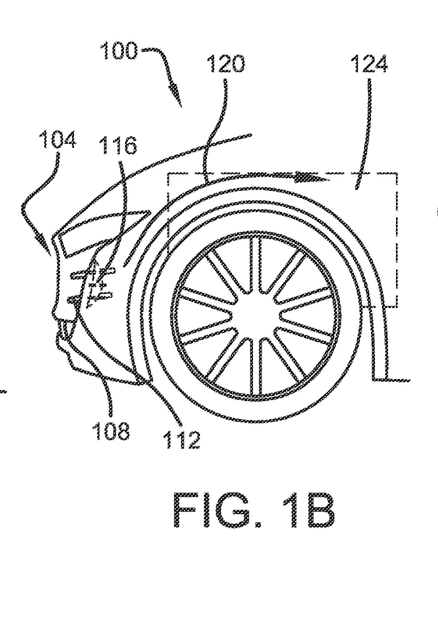
Figure 1C:
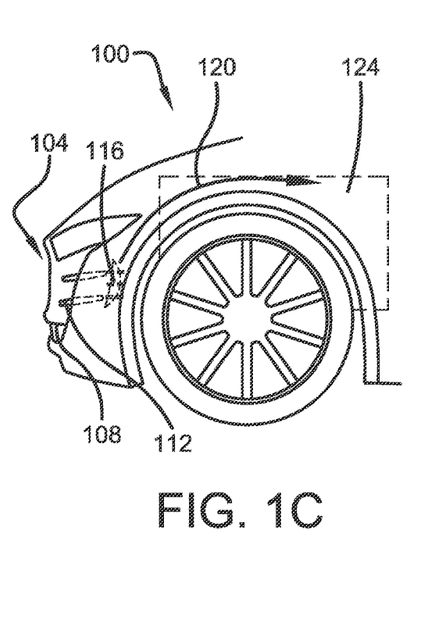

Referring now to FIGS. 1A-1C, a front portion of an example vehicle 100 is illustrated. The vehicle 100 can include a grille assembly 104. The grille assembly 104 can include a housing 108 defining one or more openings through which air can flow. Fixed or stationary grille bars 112, such as for decorative or stylistic purposes, can be disposed in the housing 108. In FIG. 1A, a fully-integrated configuration of an AGS and radar system 116 is illustrated. The AGS and radar system 116 can be located towards a front of the grille assembly 104. As previously mentioned, this may be an ideal position for both the AGS and the radar device to operate. In some implementations, the AGS and radar system 116 may share the housing 108. Air can flow through the grille bars 112 and, when open, through the AGS and radar system 116 through an air path 120 and into a powertrain compartment 124 (e.g., an engine compartment) of the vehicle 100. For example, this airflow can cool components of the powertrain compartment 124, such as a radiator.

FIGS. 1B and 1C, on the other hand, illustrate semi-integrated and standalone configurations of the AGS and radar system 116. In FIG. 1B, the AGS and radar system 116 is partially integrated into the grille assembly 104. More particularly, the AGS and radar system 116 may have its own housing (not shown) and/or share a portion of the housing 108 of the grille assembly 104. For example, the AGS and radar system 116 may be configured to be mounted to the housing 108 of the grille assembly 104. In FIG. 1C, the AGS and radar system 116 is separate or standalone from the grille assembly 104. In this configuration, the AGS and radar system 116 can have its own housing (not shown) that is entirely separate from the housing 108 of the grille assembly 104. For example, the AGS and radar system 116 may be configured to be mounted to another component of the vehicle 100 but not the housing 108 of the grille assembly 104.

Figure 2:
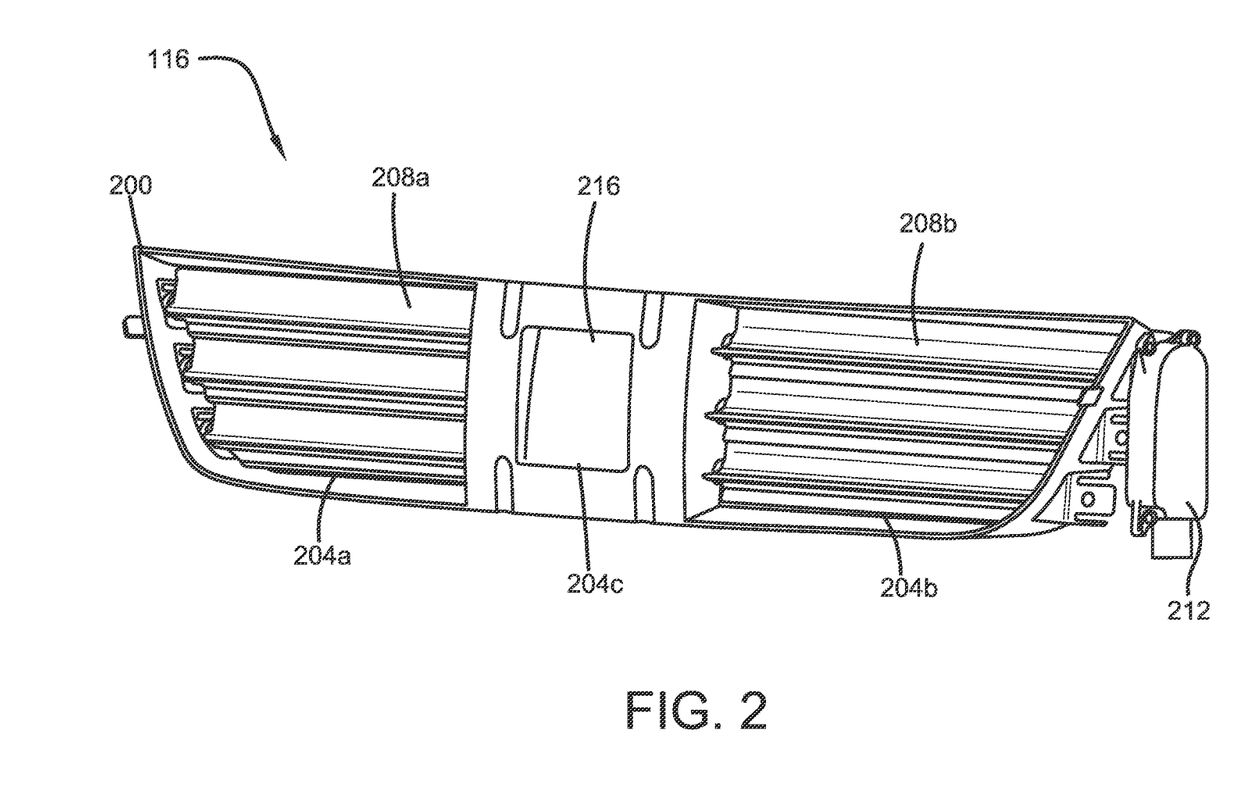
FIG. 2 is a front view of an example AGS and radar system according to some implementations of the present disclosure.

Referring now to FIG. 2, a front view of an example configuration of the AGS and radar system 116 is illustrated. The AGS and radar system 116 can include a housing 200 that defines first, second, and third openings 204a, 204b, 204c, respectively. The third opening 204c can be arranged between the first and second openings 204a, 204b. First and second sets of louvers 208a and 208b can be disposed within the first and second openings 204a and 204b, respectively. A set of actuators 212 can be configured to drive and thereby selectively open/close the first and second sets of louvers 208a, 208b. Examples of the actuators 212 include, but are not limited to, electric motors, drive shafts, drive gears, and combinations thereof. In some implementations, the set of actuators 212 can include different sets of actuators configured to drive the first and second sets of louvers 208a, 208b. In this manner, the first and second sets of louvers 208a, 208b could be driven independently of each other as opposed to being driven uniformly.

The AGS and radar system 116 can further include an object detection device 216 (hereinafter "radar device 216") disposed within the third opening 204c. In some implementations, the radar device 216 is fully integrated into the housing 200. In other implementations, the radar device 216 can be attached to the housing 200, such as via a mounting bracket or other mounting device. In other implementations, the mounting bracket/device may not be attached to the housing 200, but instead may be attached to a separate component such as a front end module (FEM) or a cross-vehicle beam. The radar device 216 can be configured to detect objects in front of the vehicle 100. As previously mentioned, examples of the radar device 216 include radar, lidar, a camera, a proximity sensor, or any suitable object detection device that is configured to detect objects in front of the vehicle 100. For maximum transmission (and thus maximum performance), the radar device 216 may require an unobstructed view of objects in front of the vehicle 100. As shown, the radar device 216 has an unobstructed view of objects in front of the vehicle via the third opening 204c. The grille assembly 104 may include a similar opening, which is discussed in greater detail below.

Figure 3:
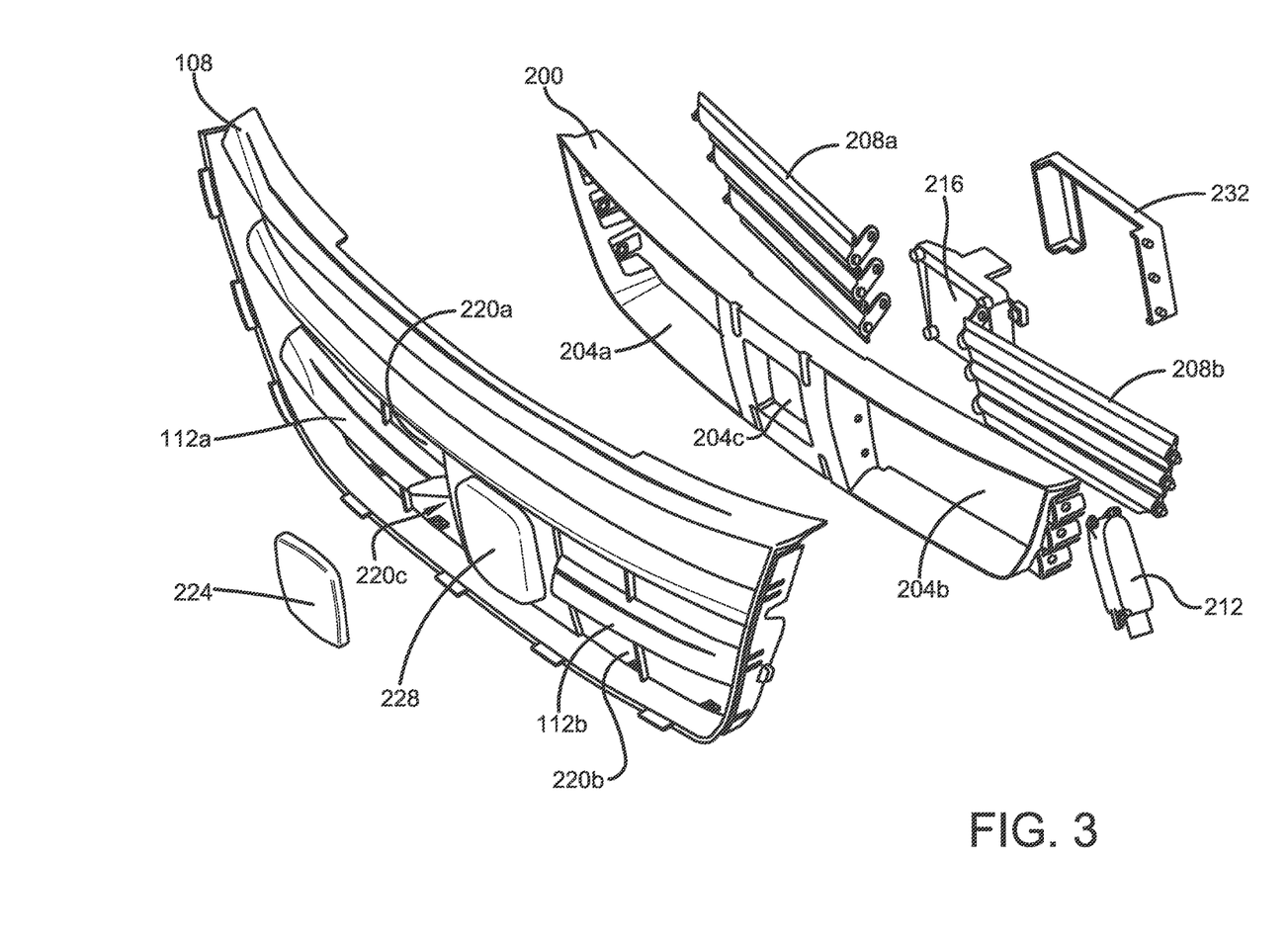
FIG. 3 is an exploded view of an example vehicle grille assembly and an example AGS and radar system according to some implementations of the present disclosure.
Figure 4:
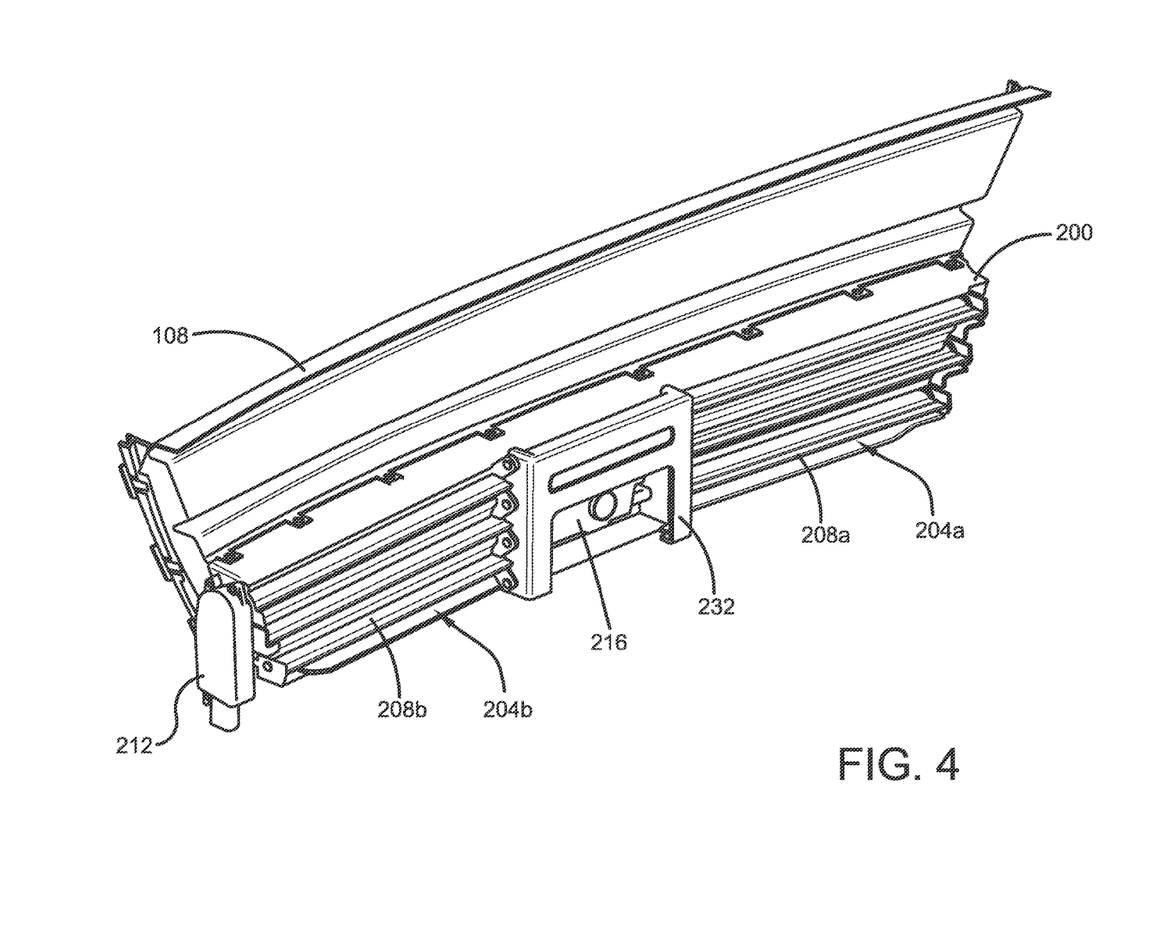
FIG. 4 is a rear view of an example vehicle grille assembly and an example AGS and radar system according to some implementations of the present disclosure.

Referring now to FIG. 3, an exploded view of an example configuration of the AGS and radar system 116 and the grille assembly 104 is illustrated. Reference can also be made to FIG. 4, which depicts a rear view of an example configuration of the AGS and radar system 116 and the grille assembly 104. As previously mentioned, the grille assembly 104 can include fixed or stationary grille bars 112. As shown, these grille bars 112 are divided into first and second sets of grille bars 112a, 112b disposed within first and second openings 220a, 220b defined by the housing 108. In some implementations, the housing 108 can also define a third opening 220c arranged between the first and second openings 220a, 220b. This third opening 220c, for example, may correspond to the third opening 204c of the AGS and radar system 116. The third opening 220c, however, may not always correspond to a specific opening of the grille assembly 104. For example, the third opening 220c may correspond to one-half of the grille assembly 104 or to multiple openings of the grille assembly 104.

In some implementations, a cover 224 (hereinafter "radar cover 224") can be implemented to protect and/or hide the radar device 216. The radar cover 224 can be constructed of any suitable material that allows for electromagnetic transmission from/to the radar device 216. In other words, the radar device 216 can be fully functional while arranged behind the radar cover 224. One example of the radar cover 224 is a radome. While the radar cover 224 is shown to be a separate component, it will be appreciated that a portion of the grille assembly 104, such as its housing 108 or grille bars 112, could be the radar cover 224. In other words, these components could be constructed of such a material that does not obstruct the radar device 216. For example only, the radar cover 224 can be a decorative emblem, such as a logo for the type of vehicle. In some implementations, the housing 108 can define another portion 228 (e.g., another opening) offset and separate from the third opening 220c. For example, this other portion 228 could be utilized to additionally or alternatively display the vehicle logo/type separate from the radar device 116 and the radar cover 224.

As shown, the first and second openings 204a, 204b of the housing 200 of the AGS and radar system 116 can correspond to the first and second openings 220a, 220b of the housing 108 of the grille assembly 104. In some implementations, the first openings 204a and 220a are aligned and the second openings 204b and 220b are aligned. The AGS and radar system 116 can further include a linkage 232 behind or around an outside of the radar device 216. In another implementation, the linkage 232 could be a straight bar linkage, such as one of the louvers 208 extending across the third opening 204c, such as above or below the radar device 216 so as not to obstruct its view. The set of actuators 212 can selectively open/close or otherwise position the first and second sets of louvers 208a, 208b either directly or via the linkage 232.

The linkage 232 can be configured to be connected to at least one end of one of the sets of louvers 208a, 208b. In some implementations, the linkage 232 can transfer motion from louvers 208b (via actuators 212) to louvers 208a. Alternatively, the linkage 232 could be driven by actuators 212 to in turn drive the louvers 208. While a single linkage 232 is shown and described herein, it will be appreciated that the linkage 232 could include two or more distinct linkages. The set of actuators 212, for example, may be controlled as desired by a vehicle controller, such as based on a temperature of a coolant inside the powertrain compartment 124 or potentially based on vehicle speed.

In some implementations, the set of actuators 212 can be arranged proximate to opening 204c and the linkage 232, such as below or offset from the radar device 216. In other implementations, such as those shown in FIGS. 2-4, the set of actuators 212 can be arranged separate from opening 204c and the linkage 232. This results in more flexibility in positioning the set of actuators 212 for smaller or more desirable packaging. For example, by arranging the actuators at the ends of the housing 200, package sizing of the AGS and radar system 116 may be improved. Additionally, while only a single AGS and radar system 116 having first and second sets of louvers 208a, 208b is shown and discussed herein, it will be appreciated that the systems of the present disclosure could be applied to vehicle grille assemblies having different configurations than those shown and described herein. For example, a different grille assembly may define a different number of openings. Alternatively, for example, a different vehicle grille assembly may have both an upper grille portion and a lower grille portion (i.e., more openings). Each of these grille portions could have its own AGS system and could be simultaneously or independently controlled. While there could be two AGS systems for such a configuration, there may only be one radar device implemented (e.g., behind a radar cover in the upper grille portion).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active grille shutter (AGS) system for a vehicle, the AGS system comprising:
    a housing defining (i) a central portion configured to align with an object detection device that is configured to detect objects in front of the vehicle and (ii) an outer portion that is distinct from the central portion;
    a plurality of louvers disposed in the outer portion of the housing;
    a linkage arranged about at least a portion of a perimeter of the central portion of the housing such that the linkage does not obstruct a field of view of the object detection device, the linkage connecting at least two louvers of the plurality of louvers; and
    a set of one or more actuators configured to selectively open/close the plurality of louvers by driving at least one of (i) the linkage and (ii) at least one of the plurality of louvers.

2. The AGS system of claim 1, wherein the set of actuators are arranged proximate to the central portion of the housing.

3. The AGS system of claim 2, wherein at least some of the set of actuators are arranged below the central portion of the housing and the linkage.

4. The AGS system of claim 1, wherein a height of the central portion is less than a height of the outer portion.

5. The AGS system of claim 1, wherein the object detection device is aligned with the central portion and arranged behind a cover, wherein the cover is arranged in front of the object detection device and within or behind a grille assembly of the vehicle, and wherein the cover is configured to protect the object detection device and allow acceptable transmission from/to the object detection device.

6. The AGS system of claim 5, wherein the cover is part of the housing.

7. The AGS system of claim 5, wherein the cover is connected to or is part of the vehicle grille assembly.

8. The AGS system of claim 5, wherein the cover defines a thickness that provides for substantially uniform electromagnetic transmission.

9. The AGS system of claim 1, further comprising a mounting device configured to attach the object detection device to the housing.

10. The AGS system of claim 1, wherein the AGS system is a separate, standalone system with respect to a grille assembly of the vehicle.

11. The AGS system of claim 1, wherein the AGS system is semi-integrated into a grille assembly of the vehicle such that the plurality of louvers define a B-side of the vehicle grille assembly.

12. The AGS system of claim 1, wherein the AGS system is fully-integrated into a grille assembly of the vehicle such that the plurality of louvers define an A-side of the vehicle grille assembly.

13. A grille assembly for a vehicle, the grille assembly comprising:
    a housing defining (i) a central portion configured to align with an object detection device that is configured to detect objects in front of the vehicle, (ii) an outer portion that is distinct from the central portion;
    a cover arranged in front of the object detection device; and
    an active grille shutter (AGS) system at least partially disposed within the housing and including:
        a plurality of louvers disposed in the outer portion of the housing;
        a linkage arranged about at least a portion of a perimeter of the central portion of the housing such that the linkage does not obstruct a field of view of the object detection device, the linkage connecting at least two louvers of the plurality of louvers; and a set of one or more actuators configured to selectively open/close the plurality of louvers by driving at least one of (i) the linkage and (ii) at least one of the plurality of louvers.

14. The grille assembly of claim 13, wherein the set of actuators are arranged proximate to the central portion of the housing.

15. The grille assembly of claim 14, wherein at least some of the set of actuators are arranged below the central portion of the housing and the linkage.

16. The grille assembly of claim 13, wherein a height of the central portion is less than a height of the outer portion.

17. The grille assembly of claim 13, wherein the cover is part of the AGS system.

18. The grille assembly of claim 13, wherein the cover is connected to or is part of the housing of the grille assembly.

19. The grille assembly of claim 13, wherein the cover defines a thickness that provides for substantially uniform electromagnetic transmission.

20. The grille assembly of claim 13, further comprising a mounting device configured to connect the object detection device to at least one of (i) the AGS system and (ii) the housing of the grille assembly.

\* \* \* \* \*